Patented Sept. 18, 1945

2,385,319

UNITED STATES PATENT OFFICE 2,385,319

PRESSURE-SENSITIVE ADHESIVE SHEETS

Warner Eustis, Newton, Mass., and George Robert Orrill, Western Springs, Ill., assignors to The Kendall Company, Boston, Mass., a corporation of Massachusetts No Drawing. Application February 21, 1941, Serial No. 380,012

4 Claims. (Cl. 117—122)

This invention relates to pressure-sensitive adhesive tapes, and more particularly to insulating tapes which comprise a flexible sheet backing, preferably of some material having high electrical insulating qualities, having on one side thereof a coating of pressure-sensitive adhesive which remains tacky at ordinary temperatures, and which, in addition to having the usual qualities and characteristics of pressure-sensitive adhesives generally, including sufficient cohesion to permit the tape to be rolled and unrolled without detrimental "picking" of the adhesive, has the physical and chemical structure to permit setting up of the adhesive into a permanent, firm, non-tacky, non-thermoplastic state after application of the tape as a tape to some article.

It is an object of the invention not only to provide tapes which find use in the electrical arts as insulating wrapping for wires, coils or electrical conductors in general, but also to provide tapes which will find use as a joining medium for fabrics, sheet rubber material, rubberized fabrics, elastic fabrics, rugs and the like. The tape of this invention, when used as an insulating wrapping or joining medium, is highly advantageous, because of its high conformability and flexibility during application, allowing its proper support and positioning during the setting up of the adhesive into a firm non-adhesive condition under predetermined and controlled conditions dependent upon the particular character of the adhesive. The setting up of the adhesive will result in a permanent bond between the tape and the article to which it has been applied, though in some instances, as in the case of protective tape, the bond may be severed by stripping the adhesive as a non-adhesive sheet from the temporarily masked article, and no residue will be left because of the non-tacky and firm sheet-like character of the set adhesive.

In the case of electrical insulating tape, the backing may comprise glass, woven or otherwise fabricated into a sheet structure, and into a flexible sheet structure if desired, or may comprise sheet asbestos, both of which materials have dielectric properties making them especially suitable for the purpose. Such glass or asbestos backings are supplied with a pressure-sensitive adhesive coating, which, while capable of preservation as a tacky pressure-sensitive adhesive so long as desired, may be set up into a firm, non-tacky bond under predetermined and controlled conditions, as of temperature, pressure, or a combination of temperature and pressure coupled with designated time periods.

A further object of the invention, therefore, is the preparation of adhesive masses which will have the necessary physical and chemical structure to permit their use in fabricating the tapes of this invention.

Where electrical insulation is not of prime importance, the backing structure of the tape may comprise other types of materials and the adhesive tape of this invention will have a variety of advantageous uses. Thus, where the tape is applied with substantial pressure as in reinforcing baseball bats, setting up of the adhesive will remove any possibility of subsequent flow of the adhesive through the backing, due to the pressure.

Among suitable backings which may be found useful in connection with this invention are the following:

Cellulosic fibrous backing materials, as cloth, woven, felted or knit, and impregnated, coated, primed or plain; paper, such as kraft, parchment or glassine impregnated, coated, primed or plain; "Webril," a trade-marked product consisting of an unwoven fibrous material as described in United States Patent No. 2,277,049, issued March 24, 1942, to Reed.

Non-fibrous backings, as regenerated cellulose, moisture-proofed or not, insolubilized gelatin, cellulose esters, such as cellulose acetate, cellulose ethers, such as benzyl cellulose and ethyl cellulose, casein.

Synthetic resinous backings, as polyvinyl esters, polyamide type backings such as nylon.

Insulating fabrics, such as woven or knit glass or asbestos fabrics. Other inorganic sheet structures, as those of mica, or clay.

Metal foil backings, as tin, aluminum, zinc, copper, lead.

Composite backings of paper, metal or non-fibrous sheets laminated with cloth, for instance, marquisettes, lawns, and wide mesh gauzes or pre-shrunk or shrink-proof or "Sanforized" cloth, or laminated with one another.

While, broadly, the invention is directed to a tape having any type of adhesive which has the necessary characteristics to permit its use in the manner set forth, as examples of such an adhesive, the following descriptions of adhesive masses, ingredients and preparation are set forth.

Where electrical insulation is not of major importance, a rubber-resin type pressure-sensitive adhesive may be utilized. Rubber-resin adhesives may be prepared either for application by a solvent spread method or for application by a calendering or frictioning operation to the desired backing. While the solvent spread application is perfectly suitable for the preparation of the tape, a calendering method is preferred, and therefore the preferred form of a rubber-resin adhesive is a milled calenderable rubber-rosin mix.

While introduction of vulcanizing ingredients or incorporation of pre-vulcanized rubber into adhesive mixes have been suggested, such vulcanizing ingredients have always acted during preparation of the mass to vulcanize a portion of the rubber content of the mass during its preparation, usually on the heated rubber mill, and the presence of pre-vulcanized rubber has acted mainly to toughen the mass. By the time such adhesives have been applied to the tape, the vulcanization process has been substantially completed, and such tapes, as tapes, are not capable of further vulcanization, and especially are not capable of further vulcanization after application of the tapes to some article under predetermined and controlled conditions to set up or vulcanize the mass into a firm, permanent, non-tacky bond.

In accordance with this invention, in the case of a rubber adhesive, vulcanizing ingredients may be introduced into the mix during the preparation of the adhesive, but the vulcanizing ingredients are of such character, and the technique of applying the mass to the backing is of such nature, that the vulcanizing ingredient or ingredients remain inactive, as far as any vulcanization reaction is concerned, throughout the process of preparation of the mass and fabrication of the tape, and become active to vulcanize the mass only under conditions not present during the manufacture of the tape.

For example, it is found that the following adhesive mass may be prepared and applied by a calendering operation to a backing structure under conditions of temperature and calendering pressure which have substantially no vulcanizing effect upon the adhesive, but, by the simple expedient of subjecting the tape to a temperature of something over 250° F., the mass may be set up into a permanent, firm, vulcanized bond:

| | Parts by weight |
|---|---|
| Rubber (smoked sheet) | 30 |
| Rosin | 30 |
| Zinc oxide | 30 |
| Starch | 6 |
| Oil | 3.5 |
| Wax | 2.5 |

To this mix on the rubber mill may be added from .1 to .5% by weight of Tuads, depending upon the particular degree of vulcanization desired in the final applied tape. Tuads is an organic vulcanizing agent of the alkyl thiuram polysulfide type.

In the milling and calendering of this mass, the temperatures may be kept well below 250° F. and the Tuads will have no vulcanizing effect upon the adhesive so long as the temperature is kept below this critical limit. Therefore, after calendering of the mass on the backing, the tape may be handled as an ordinary pressure-sensitive adhesive tape, and may be cut into strips and wound on rolls and distributed to the user for subsequent use. After application of the tape to a desired article, say a fabric, the adhesive mass may be set up into a vulcanized permanent bond, by subjecting the applied mass and tape to a temperature of 250° F. While pressure is unnecessary, the period of time required for vulcanization may in some cases be reduced by the application of pressure. Where, however, the mass coating is especially thin, the vulcanization progresses satisfactorily under atmospheric pressure at the given critical temperature.

Other vulcanizing ingredients, which may be a combination of ingredients, such as sulphur, an activator in the form of zinc oxide, and accelerators, either sulphur-bearing or otherwise, may be used either with or without Tuads. By thus varying the vulcanizing ingredients, the particular temperature at which vulcanization will occur may be changed, tho it may be less precise.

In general, any rubber-resin mix may be utilized, with the addition, of course, of the Tuads or other necessary vulcanizing ingredients, it being understood that the formula given above is merely by way of example.

A further form of adhesive mass may be laid down from an aqueous dispersion of rubber in the form of latex and rosin. In accordance with this invention, vulcanizing ingredients may be suitably dispersed in aqueous suspension and incorporated in such mixes. Due to the fact that the spreading technique in the case of such aqueous dispersions involves usually application at normal room temperatures, no vulcanization will take place during the spreading of the mass and drying of the adhesive may be effected at temperatures below the critical vulcanization temperature. The subsequent application of heat will activate the vulcanizing ingredients sufficiently to set up the latex resin adhesive into a firm bond. The addition of relatively reduced quantities of vulcanized latex in the original mix is oftentimes of advantage. For example, vulcanized latex may be added in the proportion of 10% to the unvulcanized latex. As a suitable formula for use with these ingredients, attention is directed to the disclosure of an application of Eustis et al., Serial No. 354,598, filed August 28, 1940.

As a substitute for rubber, any vulcanizable synthetic rubber, for instance polychloroprene, or Perbunan (copolymer of butadiene and acrylic acid nitrile), may be used, with suitable modification of the vulcanizing agent, if required. Although Vistanex (isobutylene polymer) is generally considered not vulcanizable, it may be included in part and does not interfere with the vulcanization of the vulcanizable rubber content.

We claim:

1. A pressure-sensitive adhesive tape comprising a flexible backing bearing on one side thereof an exposed homogeneous coating of a rubber adhesive mass normally having tacky, stable, pressure-sensitive qualities, said mass containing vulcanizing ingredients including a thiuram polysulfide which on heating releases sulfur to effect vulcanization, said vulcanizing ingredients in the quantity present being inactive at ordinary conditions of temperature to allow said adhesive to remain normally stable with tacky pressure-sensitive qualities but being active under predetermined and controlled conditions of elevated temperature to vulcanize completely said adhesive to set said coating into a firm, permanently non-tacky condition, and the other side of said tape presenting a dry exposed surface, said adhesive coating being firmly bonded to said flexible backing permitting rolling and unrolling of said tape directly on its dry back surface when the adhesive coating is in its normally pressure-sensitive state without detrimental picking of said adhesive.

2. A pressure-sensitive adhesive tape comprising a flexible backing bearing on one side thereof an exposed homogeneous coating of a normally tacky, stable, pressure-sensitive adhesive, said coating containing a rubber-resin mixture and vulcanizing ingredients for said rubber-resin mixture including a thiuram polysulfide which on heating releases sulfur to effect vulcanization, said vulcanizing ingredients in the quantity present being inactive at ordinary conditions of temperature to allow said adhesive to remain normally stable with tacky, pressure-sensitive qualities, but being active under predetermined and controlled conditions of elevated temperature to vulcanize completely said adhesive to set said adhesive into a firm, permanently non-tacky condition, and the other side of said tape presenting a dry exposed surface, said adhesive coating being firmly bonded to said flexible backing permitting rolling and unrolling of said tape directly on its dry back surface when the adhesive coating is in its normally pressure-sensitive state without detrimental picking of said adhesive.

3. The method of fabricating a pressure-sensitive adhesive tape including a flexible sheet backing bearing a pressure-sensitive adhesive mass capable of being vulcanized after application of the tape to an article to form a firm, permanently non-tacky vulcanized bond adhering said tape to said article, comprising compounding a pressure-sensitive normally tacky homogeneous rubber adhesive with vulcanizing ingredients including a thiuram polysulfide which on heating releases sulfur to effect vulcanization, said vulcanizing ingredients being present in quantity sufficient to vulcanize completely said adhesive at a predetermined and controlled elevated temperature, and applying said adhesive as a coating to the flexible backing of the tape while maintaining said adhesive, during both formulation and application to said backing, at temperatures below that at which said vulcanizing ingredients have any substantial vulcanizing action on said adhesive, whereby said adhesive, while normally tacky, pressure-sensitive and unvulcanized after application to said backing, is inherently vulcanizable and contains unreacted vulcanizing ingredients for vulcanizing said adhesive when subjected to said predetermined elevated temperature to set said adhesive into a permanently firm non-tacky condition.

4. The method as claimed in claim 3, wherein the pressure-sensitive adhesive comprises a rubber-resin mixture.

WARNER EUSTIS.
G. ROBERT ORRILL.